A. J. LUCKEY.
MACHINE FOR CUTTING THE BANDS OF GRAIN.
No. 34,973. Patented Apr. 15, 1862.
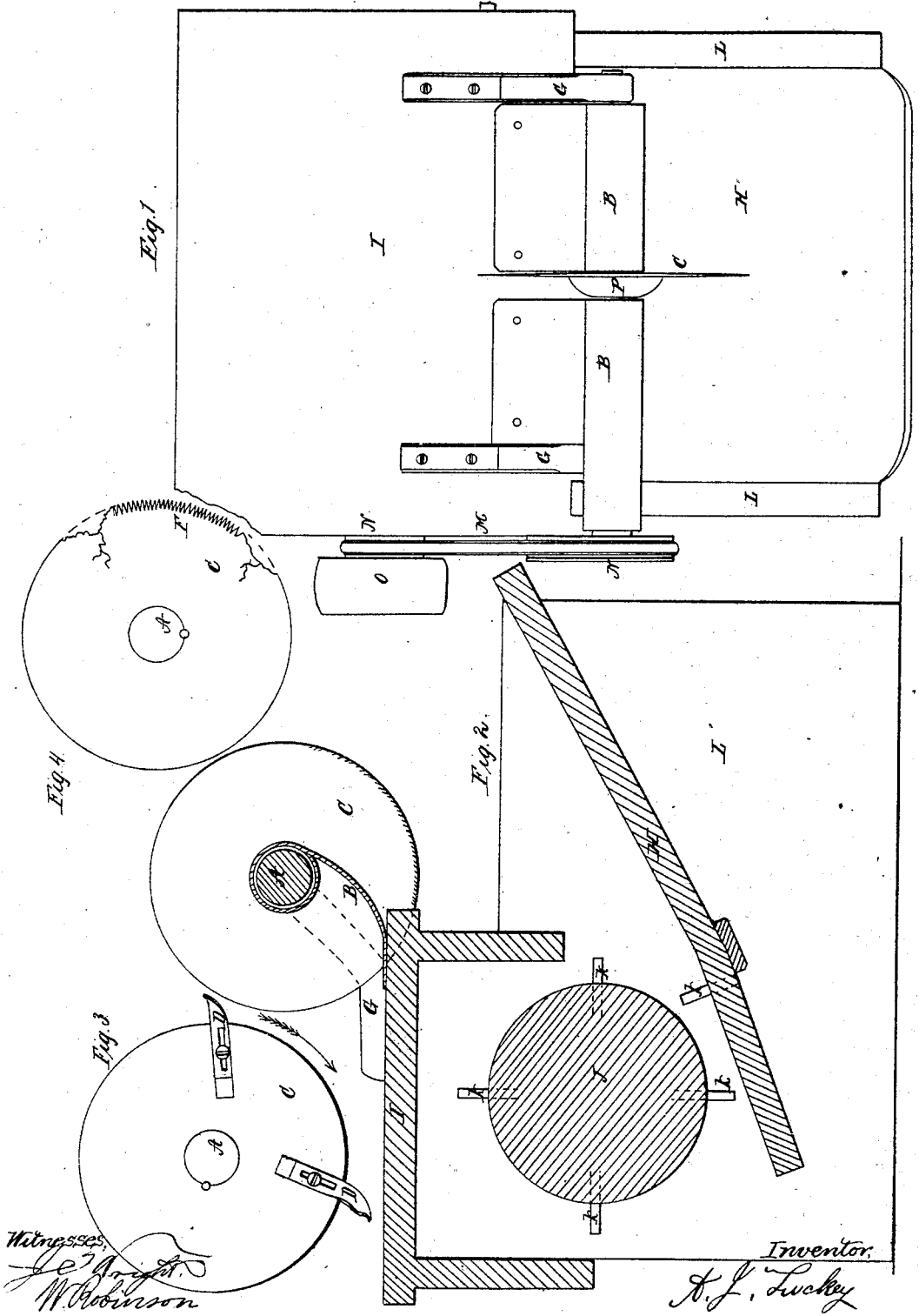

UNITED STATES PATENT OFFICE.

A. J. LUCKEY, OF BRADFORD, WISCONSIN.

IMPROVEMENT IN MACHINES FOR CUTTING THE BANDS OF GRAIN.

Specification forming part of Letters Patent No. 34,973, dated April 15, 1862.

*To all whom it may concern:*

Be it known that I, AARON J. LUCKEY, of the town of Bradford, county of Rock, and State of Wisconsin, have invented a new and useful Machine for Cutting the Bands of Grain Preparatory to Thrashing; and I do hereby declare that the following is a full, clear, and exact description of the construction and operation of the same, reference being had to the accompanying drawings, making a part of this specification, like characters referring to like parts in each figure.

Figure 1 is a top view. Fig. 2 is a longitudinal and vertical section and elevation. L represents the frame-work of the thrashing-machine. I represents the cap over the thrashing-cylinder, and to said cap is attached the curved standards G, which standards furnish bearings for the cutter-shaft A. Fig. 3 represents one form of cutter arranged with adjustable knives of various cutting forms. Fig. 4 represents a cutter furnished with teeth on the principle of a common saw.

C, Fig. 2, represents a circular sickle cutter, which cutter is secured to the collar P attached to the shaft A, which shaft has its bearings at the upper ends of the curved standards G. Motion is given to the cutter by means of the band M, which passes over the pulleys N, attached, respectively, to the shaft of the thrashing-cylinder J and the shaft A of the cutter C, thus securing corresponding and uniform action between them under all circumstances.

To illustrate the operation of the machine, we will suppose a sheaf of grain, with heads down, to be put upon and passed down the apron H to the thrashing-cylinder J until it shall come in close proximity with the teeth K of the cylinder J, in doing which it will be perceived that the band of the sheaf would be brought in dividing contact with the revolving cutter C, which instantly disengages the individual straws from binding contact, thereby enabling the operator to spread them out and pass them through the thrashing-machine at his option. To prevent the straw from winding around the shaft A, the tubular sleeve or guard B is made to inclose the shaft A, as shown by the sectional drawing, Fig. 2. Said tubular sleeve or guard B may be constructed of a metallic or other available substance in the form shown by the drawings, and secured to the cylinder-cap I by means of bolts, screws, or other fastenings required.

I do not claim as new the cutting of bands of grain by knives set in revolving cylinders combined with grain-spreading devices and attached to thrashing-machines; but I do claim—

The circular metallic disk C, having its periphery cut in the form shown and described, when used in combination with the tubular sleeve or guard B, in the manner and for the purposes set forth and described

A. J. LUCKEY.

Witnesses:
J. T. WRIGHT,
W. ROBINSON.